(12) United States Patent  (10) Patent No.: US 8,140,259 B2
Hall et al.  (45) Date of Patent: Mar. 20, 2012

(54) LOCATION DEVICE WITH A GRAVITY MEASURING DEVICE

(75) Inventors: David R. Hall, Provo, UT (US); David Lundgreen, Provo, UT (US); Christopher Durrand, Pleasant Grove, UT (US); Mark A. Schwartz, West Valley City, UT (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 12/846,647

(22) Filed: Jul. 29, 2010

(65) Prior Publication Data

US 2010/0299102 A1 Nov. 25, 2010

Related U.S. Application Data

(63) Continuation of application No. 11/772,907, filed on Jul. 3, 2007, now abandoned.

(51) Int. Cl.
*G01C 21/00* (2006.01)
*E21B 25/16* (2006.01)
*E21C 25/10* (2006.01)

(52) U.S. Cl. ............... 701/207; 175/45; 299/106

(58) Field of Classification Search ........ 701/1, 36, 701/49, 65, 66, 70, 80, 91, 93, 94, 200, 205, 701/206, 207, 208, 210, 212, 213, 214, 216, 701/217, 220, 221, 222, 226; 340/901, 988, 340/425.5, 429, 426.19, 426.22, 426.23, 340/426.24, 426.25; 73/1.75, 1.78, 54.15, 73/65.01, 65.05, 65.06, 65.09, 382 R, 382 G; 33/1 SC, 282, 283, 268, 269, 270, 277
See application file for complete search history.

(56) References Cited

U.S. PATENT DOCUMENTS

| 4,457,077 | A * | 7/1984 | Lautzenhiser ................. 33/304 |
| 5,269,065 | A * | 12/1993 | Ida ................................. 33/269 |
| 5,379,224 | A | 1/1995 | Brown et al. |
| 5,983,161 | A | 11/1999 | Lemelson et al. |
| 7,376,507 | B1 | 5/2008 | Daily |
| 2003/0218546 | A1 * | 11/2003 | Lemp, III ................... 340/815.4 |
| 2005/0240350 | A1 * | 10/2005 | Engebretson et al. ........... 702/6 |
| 2006/0070432 | A1 * | 4/2006 | Ander ........................ 73/152.05 |
| 2007/0193044 | A1 * | 8/2007 | Lemp et al. .................... 33/286 |
| 2007/0283583 | A1 * | 12/2007 | Subbiondo et al. ............. 33/268 |
| 2009/0000859 | A1 * | 1/2009 | Wang et al. .................... 181/106 |

* cited by examiner

*Primary Examiner* — James Trammell
*Assistant Examiner* — Muhammad Shafi
(74) *Attorney, Agent, or Firm* — Brinks Hofer Gilson & Lione

(57) ABSTRACT

A location device has a gravity measurement instrument in communication with a database which has the locations relative to time of an astronomical object. The location device also has a timepiece indicating the time which may be used to determine the location of the astronomical object.

8 Claims, 7 Drawing Sheets

1400

1401 Provide a gravity measurement device at a position within the universe

1402 Know a position of at least two astronomical objects which each provide a gravitational force on the gravity measurement device

1403 Measure a gravitational field of the gravity measurement device

1404 Calculate the position of the gravity measurement device from the gravitational field by determining a vector direction of the gravitational force from each astronomical object.

Fig. 14

LOCATION DEVICE WITH A GRAVITY
MEASURING DEVICE

PRIORITY CLAIM

This application is a continuation of and claims the benefit of U.S. Patent application No. 11/772,907 filed on 7/3/2007 now abandoned, the disclosure of which is incorporated by this reference for all purposes.

BACKGROUND OF THE INVENTION

In many instances the location of an object may be critical to the success of a project. Many locating systems such as Global Positioning Systems have been implemented to assist in the location of objects.

U.S. Pat. No. 5,379,224 which is herein incorporated by reference for all that it contains, discloses a Global Positioning system used in applications involving radiosondes, sonobuoys, and other objects. The GPS data is processed in a data processing workstation where the position and velocity of a sensor, at the time the data was sampled, is computed. A data buffer in the sensor is periodically refreshed, and the workstation periodically computes the new position and velocity of the sensor.

U.S. Pat. No. 5,983,161 which is herein incorporated by reference for all that it contains, discloses GPS satellite ranging signals at one of a plurality of vehicles/aircraft/automobiles that are computer processed to continuously determine the one's kinematic tracking position on a pathway with centimeter accuracy.

These types of systems have been useful in the locating of certain objects. However, these types of systems generally depend on satellite communication to function appropriately. In places where satellite communication may be impeded alternatives may be useful.

BRIEF SUMMARY OF THE INVENTION

A location device has a gravity measurement instrument in communication with a database which has the locations according to time of an astronomical object. The location device also has a timepiece indicating the time which may be used to determine the location of the astronomical object.

The location device may measure the gravitational force of least two astronomical objects creating two vector directions. Between these two vector directions an angle is formed that may be used in finding the position of the location device.

In another aspect of the invention a method comprising the steps of providing a gravity measurement instrument at a position within the universe may be used to locate the position of the gravity measurement instrument. The gravity measurement instrument may be in communication with a database that comprises the locations of at least two astronomical objects. Each astronomical object may provide a gravitational force on the gravity measurement device, creating a gravitational field. The method may further comprise measuring the gravitational field of the gravity measurement instrument; and calculating the position of the gravity measurement instrument from the gravitational field by determining a vector direction of the gravitational force from each astronomical object. Generally, a gravitometer is used in the measurement of gravitational forces. Types of gravitometer may include a zero length spring, a Lacoste gravitometer, a relative gravitometer, an absolute gravitometer, a superconducting gravitometer, or a combination thereof. Generally, the gravity measurement instrument comprises a quartz material, metallic material, elastomeric material, plastic material, or a combination thereof.

The location device may be placed in various places such as caves, cities, jungles, a plane, a submergible machine, a space shuttle, or beneath the surface of an astronomical object. In some embodiments, the location device may be used as an alternative to the commonly used GPS such as in cases where the communication between the location device and GPS satellite is blocked, or in other embodiments it may be used as a primary locating device. The location device may also be placed on a plane, a submergible machine, a space shuttle, a person, or on or in the surface of an astronomical object. The location device may be of particular importance in downhole operations such as mining and drilling operations. The location device may be deployed within a tool string or on a mining machine. The location device may further be placed within a housing that may protect it from harsh conditions. It may be of importance that the gravity measurement instrument be stationary relative to the astronomical object upon which it is positioned. Astronomical objects that may create a gravitational force on the gravity measurement instrument may include the Earth, the sun, the moon, a comet, a star, or a combination thereof. The database may comprise the locations of the astronomical objects which may be previously known or predictable. The astronomical object may move relative to the gravity measurement instrument. The gravity measurement instrument may be able to measure the gravitational forces as the astronomical object moves. The various gravitational forces and locations of the astronomical object at various positions may be recorded to the database.

In some embodiments of the present invention, the gravity measuring device may be part of an array of gravity measuring devices which may also be used to aid in determining a size, a boundary, a volume and/or a density of an astronomical object in part or in whole, such as mineral accumulations or hydrocarbon deposits. In some embodiments, tides or other local effects may be determine through the use of multiple gravity measuring devices.

BRIEF DESCRIPTION OF THE DRAWINGS

FIG. 14 is a diagram of an embodiment of a method for locating the position of the gravity measuring device.

DETAILED DESCRIPTION OF THE INVENTION AND THE PREFERRED EMBODIMENT

Figure 1:
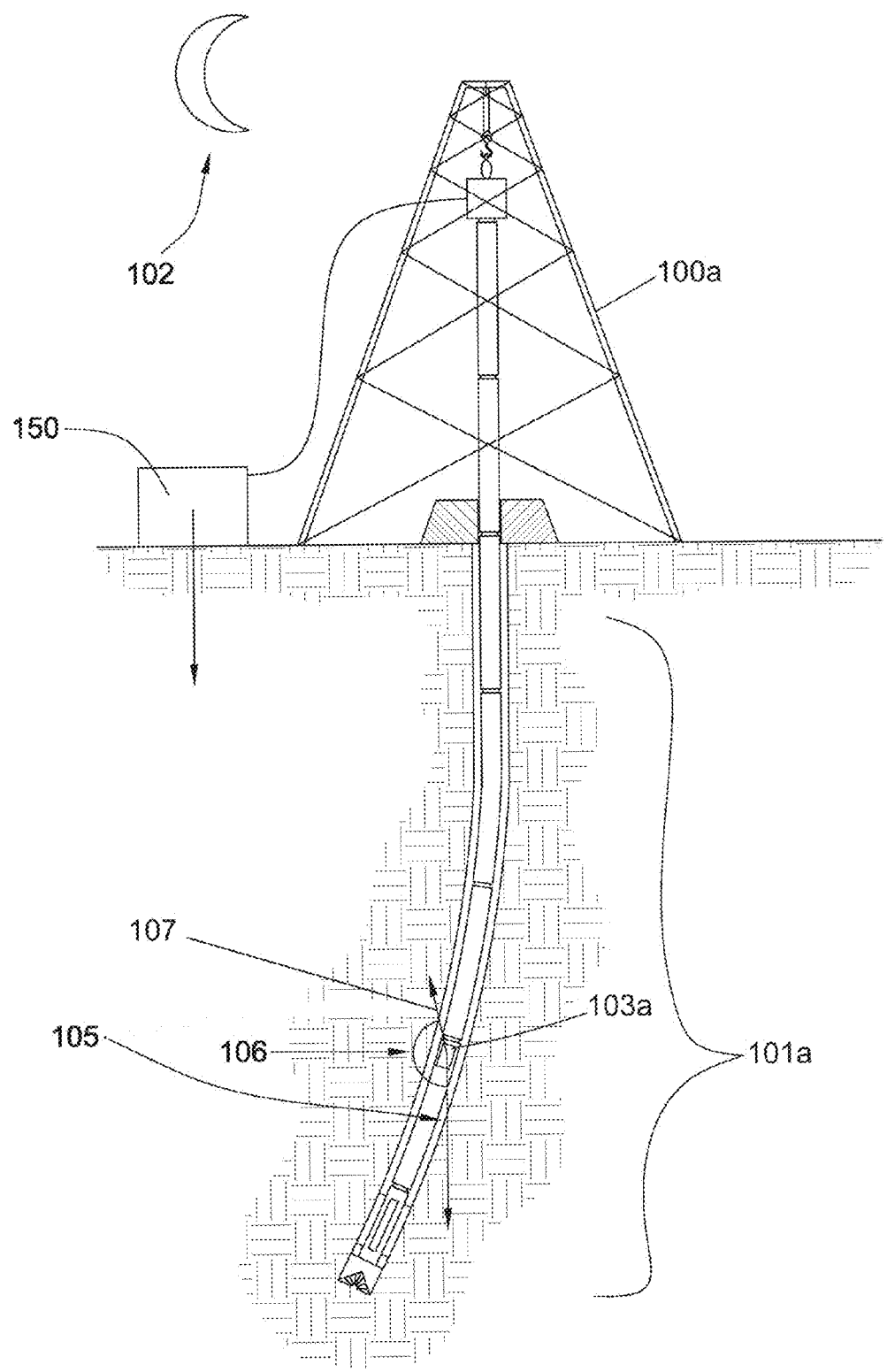
FIG. 1 is an orthogonal diagram of a derrick attached to a tool string comprising a location device.

FIG. 1 is an orthogonal diagram of a derrick 100a attached to a tool string 101a comprising a location device 103a. In FIG. 1 the location device 103a is placed downhole in the tool string 101a beneath the surface of the Earth and may continue downhole as the tool string 101a proceeds.

An astronomical object 102 may create a sufficient gravitational force that may be sensed by the location device 103a and may create a vector direction 107 toward the astronomical object 102. The astronomical object 102 may be the Earth, the moon, a comet, the sun, stars, or a combination thereof as long as its position and mass are accurately known. A second vector direction 105 may be generated from an astronomical object, such as a planet, upon which the location device 103a is placed. FIG. 1 shows one vector direction 107 generated by the moon and another vector direction 105 generated by the Earth upon which the location device is placed. With at least two vector directions 105, 107 an angle 106 between the vectors 105, 107 may be measured and may aid in locating the device 103a.

Multiple location points may be taken and recorded as the location device proceeds downhole. The inclination, rotation, and direction of the tool string may also be taken into account by the location device. Measurements, such as those taken from instruments such as accelerometers, gyroscopes, magnetometers, or other inclination and direction instrumentation may add data which may be used to help determine the location of the location device.

In some embodiments, a second gravity measuring device 150 may be located uphole on the earth's surface which may be in communication with the downhole gravity measuring device and may be used to determine changes in gravity readings at the surface. These changes may be compared to the readings taken downhole to determine if an uphole or downhole anomaly is affecting the gravity measuring device. The gravity measuring devices may be in communication with each other through tool string telemetry systems such as wired pipe, mud pulse, radio wave, or short hop. In a preferred embodiment, a telemetry system such as the one described in U.S. Pat. No. 6,670,880, which is herein incorporated by reference for all that it discloses, may be incorporated with the present invention.

Figure 2:
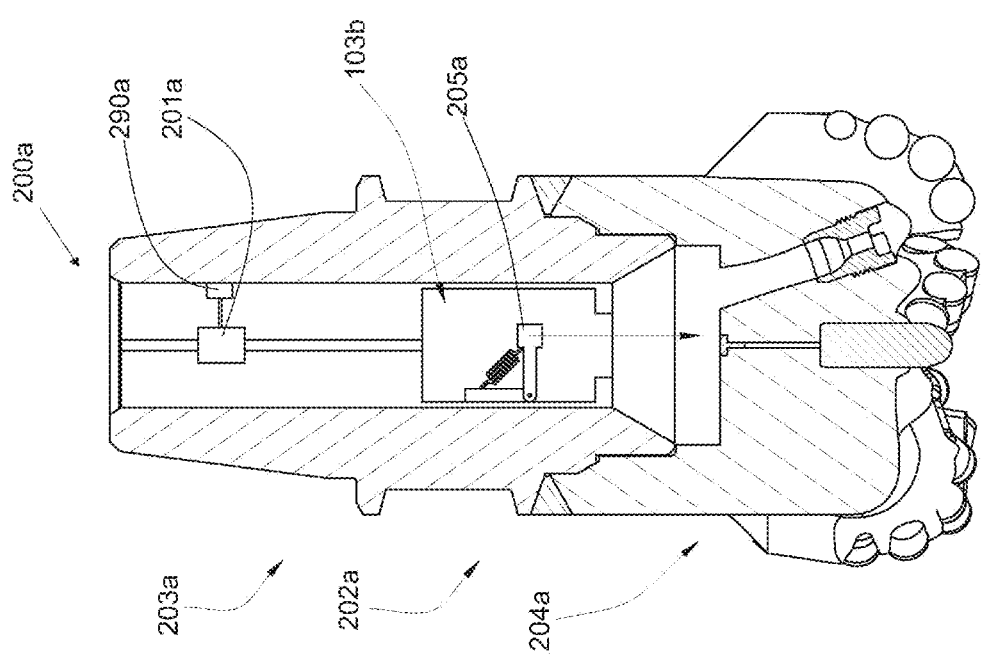
FIG. 2 is a cross-section of a drill bit comprising a location device.
Figure 4:
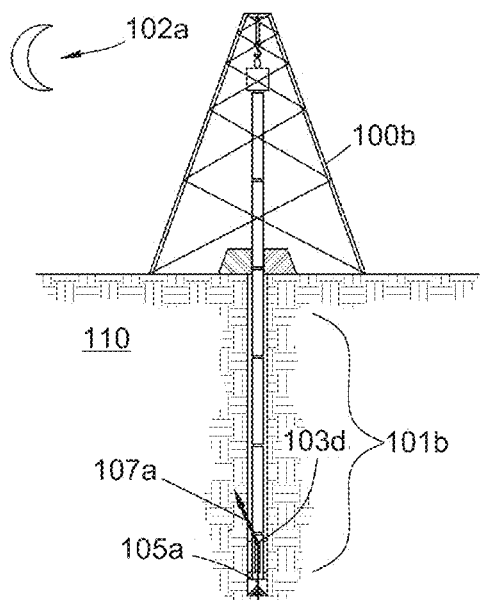
FIG. 4 is an orthogonal diagram of derrick attached to a tool string comprising a location device.
Figure 5:
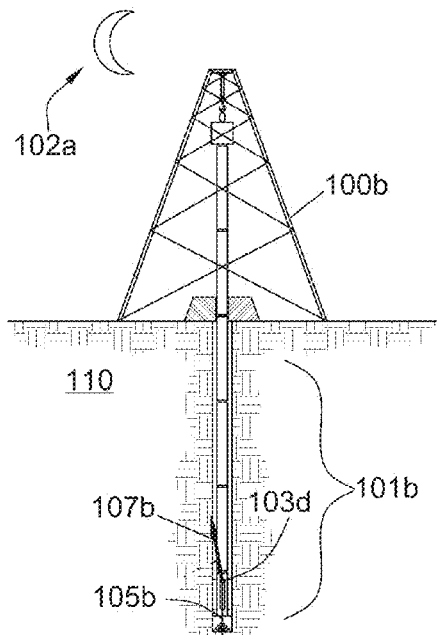
FIG. 5 is an orthogonal diagram of derrick attached to a tool string comprising a location device.
Figure 6:
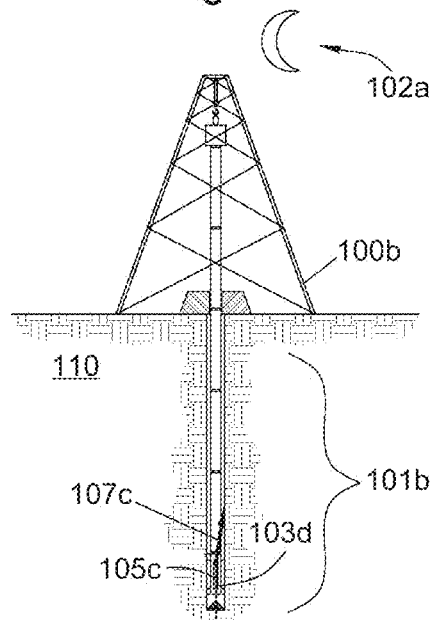
FIG. 6 is an orthogonal diagram of derrick attached to a tool string comprising a location device.
Figure 7:
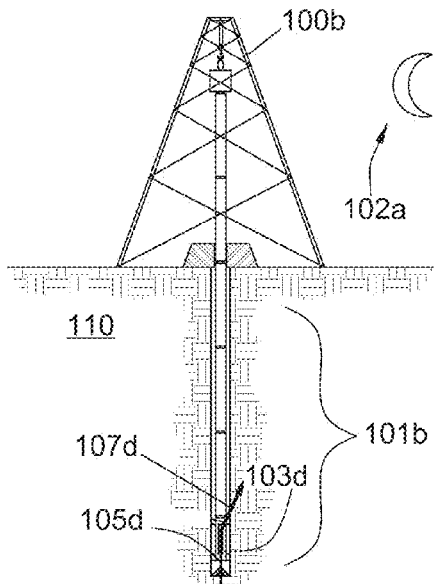
FIG. 7 is an orthogonal diagram of derrick attached to a tool string comprising a location device.

The embodiment of FIG. 2 is a cross-sectional diagram of a drill bit 200a comprising a location device 103b in communication with a database 201a. In some embodiments the database 201a may be located uphole. The drill bit 200a comprises a body 202a intermediate a shank 203a and a working surface 204a. The location device 103b may be placed in a housing in the drill bit 200a or farther up the tool string. The location device 103b may also be in communication with a timepiece 290a that may indicate the location time of an astrological object, and may be located uphole or downhole. The database 201a may comprise the locations relative to time of an astronomical object. The location device 103b may comprise a gravity measurement instrument 205a such as a relative gravimeter similar to the one shown in FIG. 2. The gravimeter in FIG. 2 is a weight on a spring, and by measuring the amount by which the weight stretches the spring, local gravity may be measured. From the direction of the gravitational forces on the location device 103b one may calculate an angle 106 between the vector directions from which a location of the device 103b may be derived.

Figure 3:
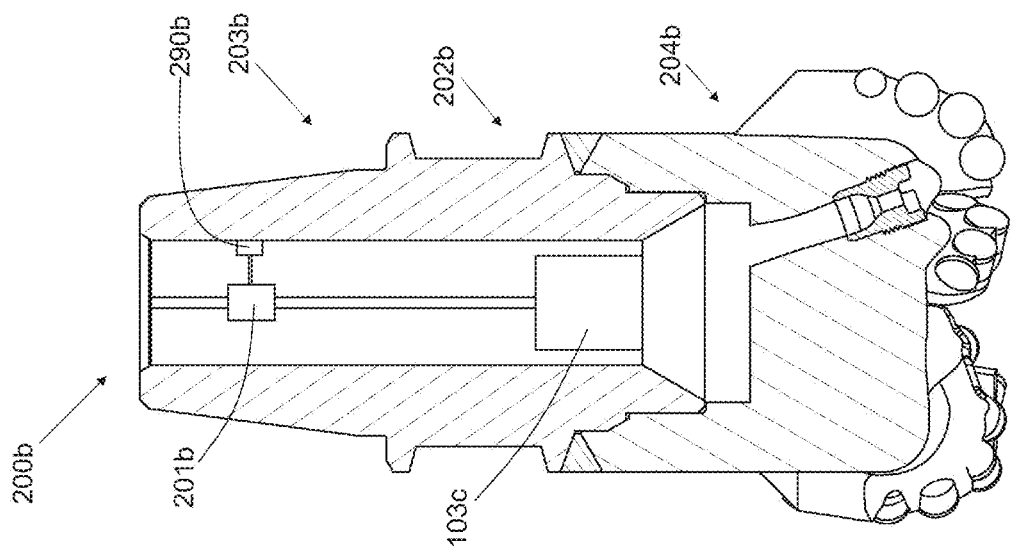
FIG. 3 is a cross-section of a drill bit comprising another embodiment of a location device.

The embodiment of FIG. 3 is a cross-sectional diagram of a drill bit 200b, comprising a location device 103c in communication with a database 201b. In some embodiments the database 201b may be located uphole. The drill bit 200b comprises a body 202b intermediate a shank 203b and a working surface 204b. The location device 103c may be placed in a housing in the drill bit 200b or farther up the tool string. The location device 103c may also be in communication with a timepiece 290b that may indicate the location time of an astrological object, and may be located uphole or downhole. The database 201b may comprise the locations relative to time of an astronomical object.

FIGS. 4-7 are orthogonal diagrams of a derrick 100b attached to a tool string 101b including another embodiment of a location device 103d shown at different times. In FIGS. 4-7 the location device 103d is stationary relative to the Earth 110 upon which it is positioned. Another astronomical object 102a that may create a vector direction 107a may move relative to the location device 103d. As the astronomical object 102a moves relative to the location device 103d it may continue to exert a gravitational force on the location device 103d. This gravitational force may be continuously measured by the location device 103d as the astronomical object 102a moves.

FIGS. 4-7 shows a vector direction toward the center of the Earth 110 while the other vector direction generated by the moon moves with the moon throughout FIGS. 4-7 as shown by the progression of vector direction 107a to 107d and vector direction 105a to 105d. The location device 103d may be in communication with the database that may record this data. Knowledge of this data is important in downhole applications due to the unpredictability of the location of a drill bit during the drilling process. Knowing the location of the drill bit aids in locating substances such as oil, natural gas, coal methane, hydrocarbons, minerals, or a combination thereof.

Other applications may arise where the location device is placed on astronomical bodies such as the moon. As the location device is stationary relative to the moon the gravitational force of another astronomical object such as the Earth may be measured as it moves relative to the location device, which may be useful for drilling or exploration applications on the moon.

Figure 8:
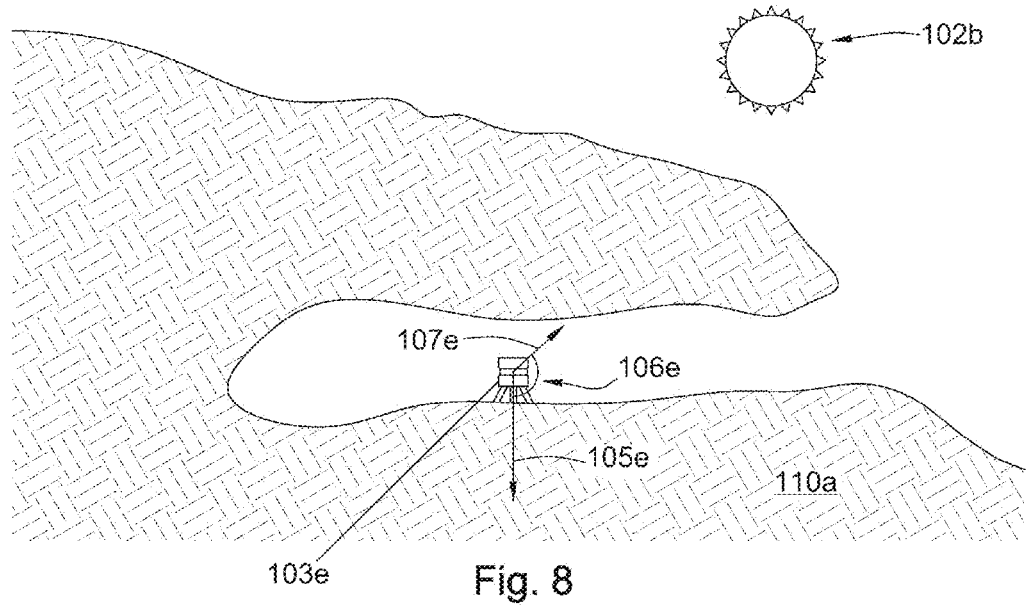
FIG. 8 is an orthogonal diagram of a location device positioned within an under ground enclosure.

FIG. 8 is an orthogonal diagram of another embodiment of a location device 103e situated within an underground enclosure, such as a cave. The location device 103e may be able to sense the gravitational forces that may create a vector directions 105e through a formation of the earth 110a and vector direction 107e to an astronomical body 102b.

The formation may be rock, limestone, mud, concrete, or a combination thereof. An angle 106e is formed by the two vector directions 105e, 107e and may be used to locate the device 103e.

Figure 9:
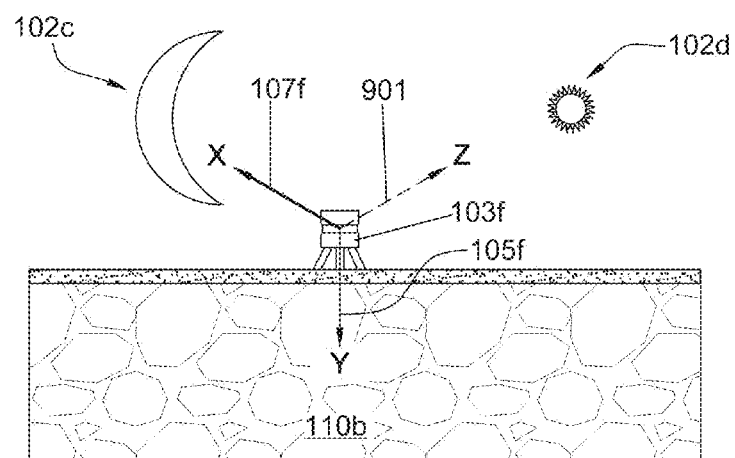
FIG. 9 is an orthogonal diagram of a location device with more than two vector directions.

FIG. 9 is an orthogonal diagram of another embodiment of a location device 103f. The location device 103f may measure the force of gravity from more than two astronomical objects 102c, 102d, and 110a creating more than two vector directions 105f, 107f. FIG. 9 shows three vector directions 105f, 107f, and 901 caused by three astronomical objects. The astronomical objects 102c, 102d, and 110a may be the Earth, the moon, a comet, the sun, stars, or a combination thereof.

Figure 10:
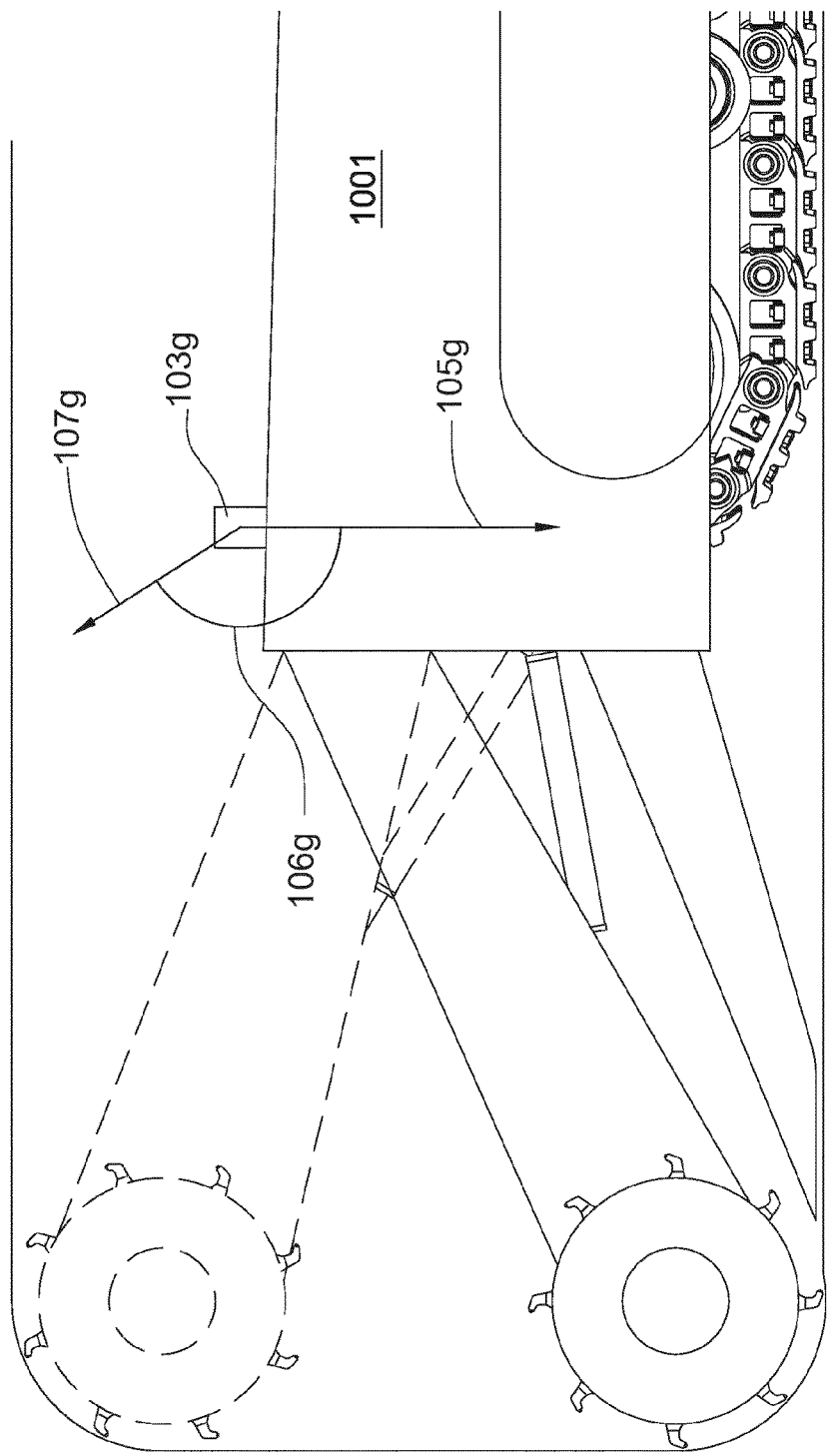
FIG. 10 is an orthogonal diagram of a location device located on a mining machine.

FIG. 10 is an orthogonal diagram of a location device 103g on a mining machine 1001. The location device 103g may be placed in or on the mining machine 1001. The location device 103g may travel with the mining machine 1001 and may take periodic or occasional readings while the mining machine 1001 is stopped to find its location. The location device 103g may be able to sense the gravitational forces of astronomical objects during the mining process creating at least two vector directions 105g, 107g. An angle 106g is formed by at least two vector directions 105g, 107g which may aid in locating the mining machine 1001.

Figure 11:
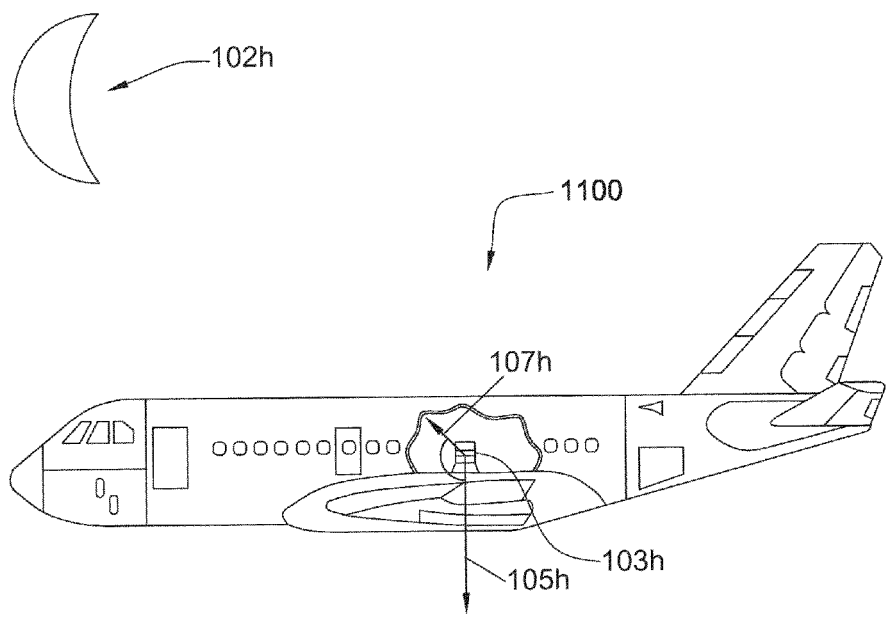
FIG. 11 is an orthogonal diagram of a location device located within an aircraft.

FIG. 11 is an orthogonal diagram of an airplane 1100 comprising a location device 103h. The location device 103h may be able to sense the gravitational pull and vector direction 105h 107h of at least astronomical objects 102h and another astronomical object (not illustrated). As the plane 1100 moves the location device 103h may be in communication with a database that comprises the location of an astrological object 102h. In such embodiments, the gravity measurement device will take into account the movement of the airplane. Accelerometers, gyroscopes, magnetometers, may be used to take into account the movement of the airplane. In some embodiments, the altitude may also be taken into account.

Figures 12, 13:
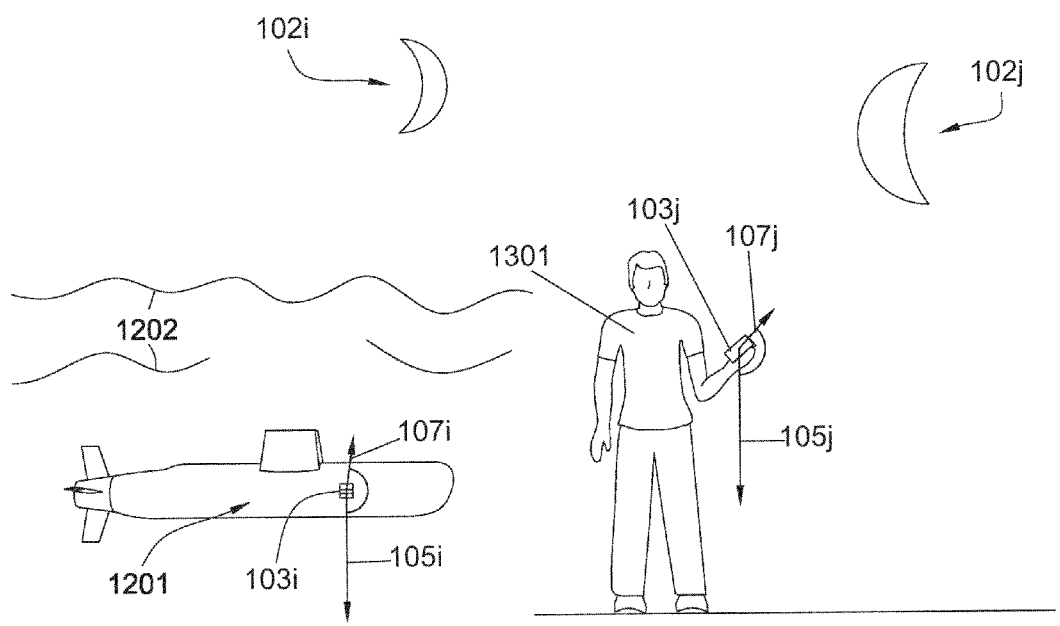
FIG. 12 is an orthogonal diagram of a location device located within a submergible machine.
FIG. 13 is an orthogonal diagram of a location device on a person.

FIG. 12 is an orthogonal diagram of a submergible object 1201 comprising a location device 103i. The location device 103i may be able to sense the gravitational force while submerged in a liquid 1202 of at least astronomical objects 102i and another astronomical object (not illustrated). The submergible object 1201 may be a submarine, a mine, a fish trap, a SCUBA diver, a scientific instrument or combinations thereof. In some embodiments, a depth may be used in conjunction with the gravity measuring device to help determine the location.

FIG. 13 is an orthogonal diagram of a person 1301 possessing a location device 103j. The location device 103j may be able to sense the gravitational pull and vector direction 105j, 107j of at least astronomical object 102j and another astronomical object (not illustrated). The location device 103j may be in wireless communication with a database. The database may comprise the location of an astronomical object 102j relative to time. The location device 103j may be in the form of a handheld device.

FIG. 14 is a method 1400 of locating the position of an object. The method 1400 comprises a step 1401 providing a gravity measurement instrument at a position within the universe. The method 1400 further comprises a step 1402 of knowing a position of at least two astronomical objects which each provide a gravitational force on the gravity measurement device. The method 1400 further comprises a step 1403 of measuring a gravitational field of the gravity measurement device. The method 1400 further comprises a step 1404 of calculating the position of the gravity measurement instrument from the gravitational field by determining a vector direction of the gravitational force from each astronomical object. In some embodiments, the method may comprise an additional step of including other information, such as information from another gravity measuring device or another sensor, as necessary to determine the location.

Whereas the present invention has been described in particular relation to the drawings attached hereto, it should be understood that other and further modifications apart from those shown or suggested herein, may be made within the scope and spirit of the present invention.

What is claimed is:

1. A location device embedded within a drill bit, the location device, comprising:
    a gravity measurement instrument, said gravity measurement instrument being configured to measure a gravitation field at a location of said device and to generate a gravitation signal that is reflective of said gravitation field;
    a timepiece indicating a time at said location during which said gravity measurement instrument measures said gravitation field and configured to generate a time signal reflective of said time;
    a database that includes location data as a function of time for a first astronomical object relative to a second astronomical object, said database configured to be in communication with said gravity measurement instrument and said timepiece, said database receiving said time signal and said gravitation signal and configured to calculate:
    a first vector direction dependent upon said gravitation signal and said time signal;
    a second vector direction dependent upon said gravitation signal and said time signal; and
    position data indicating said location of said device, said position data dependent upon said first vector direction, said second vector direction, said time signal, and said location data as a function of time.

2. The location device of claim 1, further comprising a second gravity measurement instrument to measure the gravitation field at a surface location and to generate a second gravitation signal reflective of said gravitation field at the surface location, the second gravity measurement device in communication with said database, the database further configured to compensate for anomalies in the gravitational field dependent upon the gravitation signal and the second gravitation signal.

3. The location device of claim 1, wherein the first vector direction is further dependent upon a location of said first astronomical object at said time and the second vector direction is further dependent upon a location of said second astronomical object at said time.

4. A method for locating a location of a drill bit comprising:
    obtaining a drill bit having: a gravity measurement instrument, said gravity measurement instrument configured to measure a gravitation field at a location of said gravity measurement instrument and to generate a gravitation signal reflective of said gravitation field;
    a timepiece indicating a time at said location during which said gravity measurement instrument measures said gravitation field and configured to generate a time signal reflective of said time;
    a database that includes location data as a function of time for a first astronomical object relative to a second astronomical object, said database configured to be in communication with said gravity measurement instrument and said timepiece, said database receiving said time signal and said gravitation signal and configured to calculate:
        a first vector direction dependent upon said gravitation signal and said time signal;
        a second vector direction dependent upon said gravitation signal and said time signal; and
        position data indicating said location of said device dependent upon said first vector direction, said second vector direction, said time signal, and said location data as a function of time;
    measuring said gravitation field at said location;
    generating said gravitation signal;
    generating said time signal;
    calculating said first vector direction;
    calculating said second vector direction;
    calculating said position data.

5. The method of claim 4, further comprising:
    obtaining a second gravity measurement instrument located at a surface location, said second gravity measurement instrument configured to measure a surface gravitation field and to generate a surface gravitation signal reflective of said surface gravitation field;

measuring said surface gravitational field at said surface location;

generating a surface gravitation signal;

detecting changes in said surface gravitation signal;

comparing said changes in said surface gravitation signal to said gravitation signal.

6. The method of claim 4, further comprising the first vector direction being dependent upon a location of said first astronomical object at said time and the second vector direction being dependent upon a location of said second astronomical object at said time.

7. A location device embedded within a drill bit, the location device, comprising:

a gravity measurement instrument, said gravity measurement instrument being configured to measure a gravitation field at a location of said device and to generate a gravitation signal that is reflective of said gravitation field;

a timepiece indicating a time at said location during which said gravity measurement instrument measures said gravitation field and configured to generate a time signal reflective of said time;

a database that includes location data as a function of time for at least a first astronomical object and a second astronomical object, said database configured to be in communication with said gravity measurement instrument and said timepiece, said database receiving said time signal and said gravitation signal and configured to calculate:

a first vector direction dependent upon said gravitation signal, said time signal, and a location of said first astronomical object at said time;

a second vector direction dependent upon said gravitation signal, said time signal, and a location of said second astronomical object at said second time; and position data indicating said location of said device, said position data dependent upon said first vector direction, said second vector direction, said time signal, and said location data as a function of time.

8. The location device of claim 7, further comprising a second gravity measurement instrument to measure the gravitation field at a surface location and to generate a second gravitation signal reflective of said gravitation field at the surface location, the second gravity measurement device in communication with said database, the database further configured to compensate for anomalies in the gravitational field dependent upon the gravitation signal and the second gravitation signal.

* * * * *